United States Patent [19]

Person

[11] Patent Number: 5,027,549
[45] Date of Patent: Jul. 2, 1991

[54] INSECT CAPTURING DEVICE

[76] Inventor: Carl E. Person, 330 W. 55th St., New York, N.Y. 10019

[21] Appl. No.: 512,367

[22] Filed: Apr. 23, 1990

[51] Int. Cl.$^5$ .............................................. A01M 3/00
[52] U.S. Cl. .................................................... 43/134
[58] Field of Search ................... 43/134; 81/394, 405, 81/415, 417, 427

[56] References Cited

U.S. PATENT DOCUMENTS

| | | | |
|---|---|---|---|
| 1,751,155 | 3/1930 | Heny | 81/394 |
| 3,106,923 | 10/1963 | Kelly | 81/417 |
| 3,790,203 | 2/1974 | Urbas | 81/427 |
| 4,163,340 | 8/1979 | Vander Merwe | 43/134 |
| 4,174,586 | 11/1979 | Burzdak | 43/134 |

FOREIGN PATENT DOCUMENTS 235405 7/1910 Fed. Rep. of Germany ........ 43/134

*Primary Examiner*—Richard K. Seidel
*Assistant Examiner*—Chuck Y. Mah
*Attorney, Agent, or Firm*—Kenneth A. Roddy

[57] ABSTRACT

An insect capturing device comprising a pair of elongate longitudinal members pivotally connected together at a point along their length to pivot relative to one another in a scissors fashion about the point of connection with handles at one end and a pair of foraminous cup-shaped members secured in opposed relation at the ends opposite the handles. The cup-shaped members are moved by the longitudinal members between an open position spaced a distance apart and a closed position where they are brought face to face to form an enclosure for capturing an insect therein. The open ends of the cup-shaped members are configured to facilitate secure engagement in the closed position and prevent accidental opening to allow the user to release the handle and still maintain the cup-shaped members in the closed position. In one embodiment, a magnetic ring or flange surrounds the open ends of the cup-shaped members causing the cup-shaped members to be attracted toward one another when in close proximity and to snap together to assume the closed position. In another embodiment, a fabric type fastener surrounds the open ends of the cup-shaped members. The device may also be used as a toy or novelty item to transform the capturing of flies and other insects into a sport of skill and amusement.

15 Claims, 2 Drawing Sheets

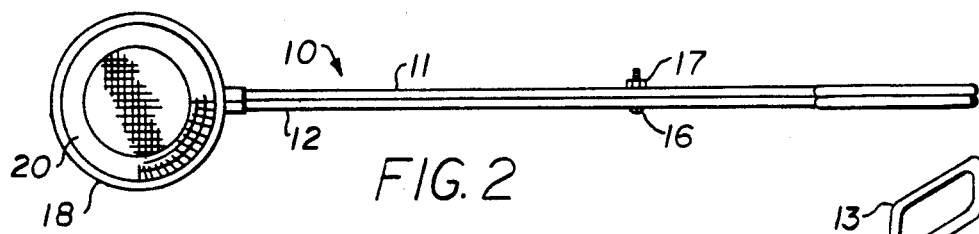
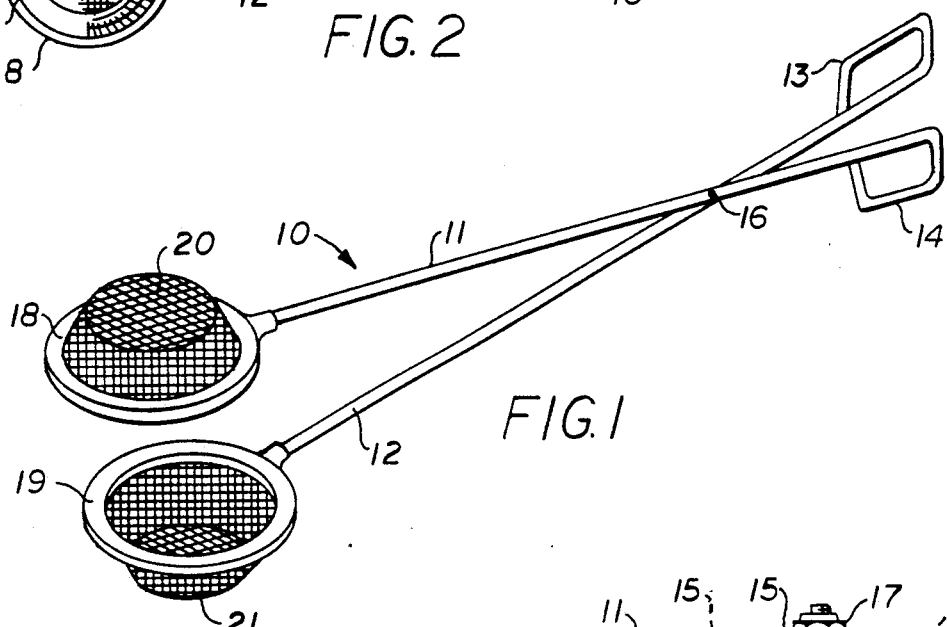
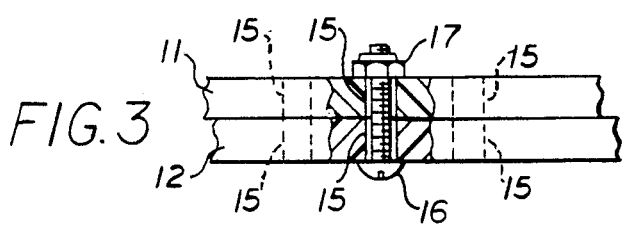
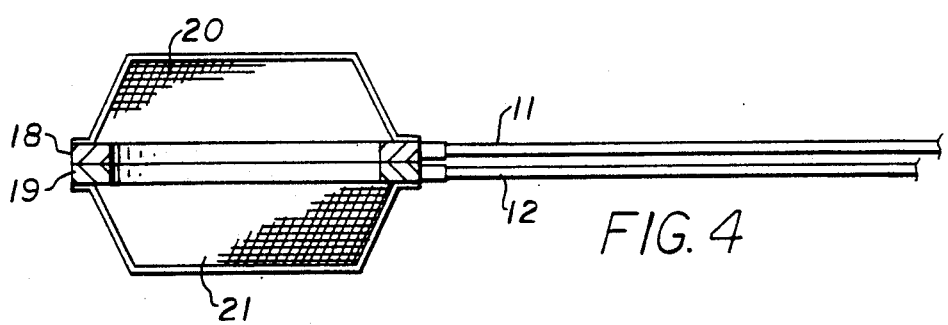
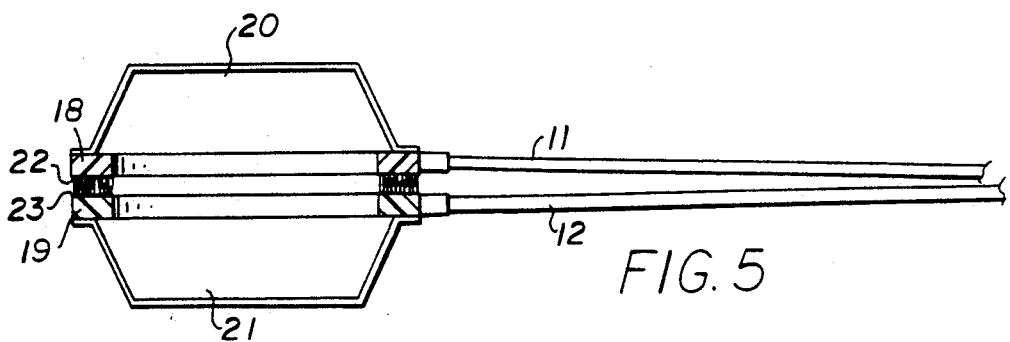

INSECT CAPTURING DEVICE

BACKGROUND OF THE INVENTION

1. Field of the Invention

This invention relates generally to insect capturing devices, and more particularly to an insect capturing device which does not kill the insect while it is being captured and has a locking feature to secure the device in the closed position.

2. Brief Description of the Prior Art

Many insects, such as flies and mosquitoes are unhealthy, distracting, and troublesome pests. These types of insects are difficult to exterminate with conventional devices such as fly swatters and the like. Most insecticides and other atomized and aerosol sprays have an unpleasant odor, and spraying a room to exterminate the insect will often make the room occupants ill. Some persons do not wish to kill insects but to just remove them from the premises.

In some instances it is desirable to capture certain types of insects without killing them or damaging them in order to study or transport them, and later release them to their natural surroundings.

It is also desirable to provide a novel toy item which may be used indoors or outdoors to transform the capturing of flies and other insects into a sport of skill and amusement.

There are several patents which disclose various insect capturing and exterminating devices.

Weiner, U.S. Pat. No. 4,213,460 discloses a forceps with a pair of closeable arms having cup-shaped gripping members at the ends which grip the protruding portion of a tick or other parasite attached to the skin. At least one of the cups may be provided with an electrical thermal element or a chemical applicator which causes the parasite to release its bite allowing it to be removed by the forceps.

Van der Merwe, U.S. Pat. No. 4,163,340 discloses a hand operated device for capturing and exterminating houseflies. The device has two jaws each with a plastic dome at the end which may also contain a poison. The actuating mechanism comprises two elongate arms connected to the jaws at one end and to a base plate at the other end. The arms are biased together by a spring. A retracting pin has a disc which passes through an opening in the pivoted end of the arms and is connected to a trigger. In use, the pin is retracted to open the jaws and the insect is carefully approached. When the jaws are positioned on either side of the fly, the trigger is pulled to capture the fly between the dome.

Burzdak, U.S. Pat. No. 4,174,586 discloses a bug catcher which captures an insect without killing it. The device comprises a pair of elongate arms spring hinged together at one end. One of the arms has a flat platform at its other end which allows the insect to be scooped up and the other arm has a clear plastic cup-shaped member at its end which is closed by the platform.

Disney, U.S. Pat. No. 1,750,163 discloses an insect trap comprising a transparent receptacle at the end of a handle which has a spring loaded flexible closure at the open bottom end. The open end is placed over the insect and the spring mechanism is released to pull the closure over the open end capturing the insect inside the receptacle.

Marsh, U.S. Pat. No. 160,606 discloses a chinch-bug gatherer in the form of a pair of shears which operate in a scissors-like manner.

The present invention is distinguished over the prior art in general, and these patents in particular by an insect capturing device comprising a pair of elongate longitudinal members pivotally connected together at a point along their length to pivot relative to one another in a scissors fashion about the point of connection with handles at one end and a pair of foraminous cup-shaped members secured in opposed relation at the ends opposite the handles. The cup-shaped members are moved by the longitudinal members between an open position spaced a distance apart and a closed position where they are brought face to face to form an enclosure for capturing an insect therein. The open ends of the cup-shaped members are configured to facilitate secure engagement in the closed position and prevent accidental opening to allow the user to release the handles and still maintain the cup-shaped members in the closed position In one embodiment, a magnetic ring or flange surrounds the open ends of the cup-shaped members causing the cup-shaped members to be attracted toward one another when in close proximity and to snap together to assume the closed position. In another embodiment, a fabric type fastener surrounds the open ends of the cup-shaped members. The device may also be used as a toy or novelty item to transform the capturing of flies and other insects into a sport of skill and amusement.

SUMMARY OF THE INVENTION

It is therefore an object of the present invention to provide an insect capturing device to trap flies, mosquitoes, and other insects, while they are flying, moving, or stationary, and to facilitate their extermination if desired It is another object of this invention to provide an insect capturing device which does not kill the insect while it is being captured.

Another object of this invention to provide an insect capturing device which has a locking feature to secure the device in the closed position Another object of this invention is to provide an insect capturing device which is quickly and easily operated Another object of this invention is to provide an insect capturing device which has a minimum of moving parts.

A further object of this invention is to provide an insect capturing device which may be used as a toy or novelty item which transforms the capturing of flies and other insects into a sport of skill and amusement A still further object of this invention is to provide an insect capturing device which is simple in construction, economical to manufacture, and rugged and reliable in use.

Other objects of the invention will become apparent from time to time throughout the specification and claims as hereinafter related.

The above noted objects and other objects of the invention are accomplished by an insect capturing device comprising a pair of elongate longitudinal members pivotally connected together at a point along their length to pivot relative to one another in a scissors fashion about the point of connection with handles at one end and a pair of foraminous cup-shaped members secured in opposed relation at the ends opposite the handles. The cup-shaped members are moved by the longitudinal members between an open position spaced a distance apart and a closed position where they are brought face to face to form an enclosure for capturing an insect therein. The open ends of the cup-shaped members are configured to facilitate secure engagement in the closed position and prevent accidental opening to allow the user to release the handles and still maintain the cup-shaped members in the closed position. In one embodiment, a magnetic ring or flange surrounds the open ends of the cup-shaped members causing the cup-shaped members to be attracted toward one another when in close proximity and to snap together to assume the closed position. In another embodiment, a fabric type fastener surrounds the open ends of the cup-shaped members. The device may also be used as a toy or novelty item to transform the capturing of flies and other insects into a sport of skill and amusement.

BRIEF DESCRIPTION OF THE DRAWINGS

FIG. 1 is an isometric view of the insect capturing device in accordance with the present invention.

FIG. 2 is a top plan view of the insect capturing device of FIG. 1.

FIG. 3 is a partial cross section through the scissors portion of the insect capturing device.

FIG. 4 is a partial cross section view of the forward portion of the insect capturing device.

FIG. 5 is a partial cross section view of the forward portion of the insect capturing device having mating elements of a fabric type fastener secured to the flanges surrounding the open ends of the cup-shaped members.

DESCRIPTION OF THE PREFERRED EMBODIMENT

Figure 6:
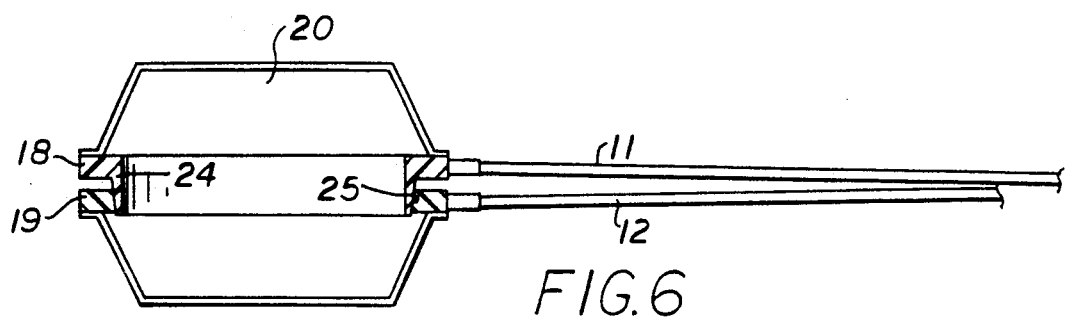
FIG. 6 is a partial cross section view of the forward portion of the insect capturing device having a mating male and female configuration surrounding the open ends of the cup-shaped members.

Referring to the drawings by numerals of reference, there is shown in FIGS. 1-4, a preferred insect trapping device 10 used to trap flies, bees, mosquitoes, and other insects, and to facilitate their extermination if desired.

The insect trapping device 10 comprises a pair of elongate sticks or rod members 11 and 12 of substantially equal length (preferably from twelve to thirty-six inches). The rearward end of the rod members 11 and 12 serve as handles and may be bent into opposed loops to form handles 13 and 14 for receiving the thumb and fingers respectively of the user. One or more longitudinally spaced transverse holes 15 extend through each rod member near the handle ends (FIG. 3).

The rod members 11 and 12 are pivotally connected together in a scissors fashion by conventional means such as a rivet or by a bolt 16 and nut 17 installed through two axially aligned holes. A sleeve or bushing (not shown) may also be provided to extend through two axially aligned holes 15 and the bolt 16 and nut 17 installed through the bushing to pivotally connect the two rod members 11 and 12 together. Use of a nut and bolt allows the rod members to be easily disassembled for packaging, storage, or transportation.

Circular bands or flange members 18 and 19 approximately ¼' to ½' wide are secured to the free ends of the rod members 11 and 12 in axially aligned relation. The flange members 18 and 19 may be formed of magnetic material such as magnetized metal or plastic material impregnated with magnetized metallic particles whereby the flange members will be attracted toward one another and will snap together when in close proximity to facilitate the secure engagement of the flange members when brought together and to prevent accidental opening once they have been forcefully closed together.

Cup-shaped members 20 and 21 formed of light weight foraminous material (full of holes) are secured to the circular flange members 128 and 19 in opposed relation. The cup shaped members 20 and 21 may be made of any suitable foraminous material, such as screen, wire mesh, or the like. Preferably, the foraminous cup-shaped members are formed of a grid pattern such that the insect therein may be seen but cannot escape. The cup-shaped members 20 and 21 may be integrally formed with the flange members 18 and 19 or secured thereon by conventional means, such as epoxy or sonic welding such that when the flanges 18 and 19 are engaged face to face, there is no means of escape for an insect trapped within the opposed cup-shaped members.

As seen in FIG. 3, a plurality of holes 15 may be provided through the rod members at longitudinally spaced locations for allowing them to be connected together at various distances to change the pivot point relative to the cup-shaped members and thus the spacing apart of the cup-shaped members when they are in the open position.

Alternatively, as seen in FIG. 5, mating elements 22 and 23 of a fabric type fastener, such as Velcro, may be secured to the flanges 18 and 19 surrounding the open ends of the cup-shaped members 20 and 21 to facilitate the secure engagement of the flange members when brought together and to prevent accidental opening once they have been forcefully closed together.

As shown in FIG. 6, the opposed faces of the flange members 18 and 19 may also alternatively be provided with a circular male rim 24 and a corresponding female tapered bore 25 respectively which slidably interfit to facilitate the secure engagement of the flange members when brought together and to prevent accidental opening once they have been forcefully closed together.

It should be understood that other suitable materials or mechanical equivalents may be used in combination with the flange members, such as magnetic tape, detents and protrusions, or other means to facilitate the secure engagement of the flange members when brought together and to prevent accidental opening once they have been forcefully closed together.

Figure 7:
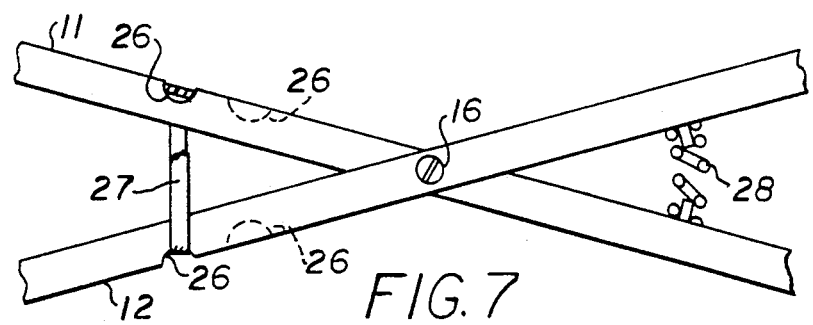
FIG. 7 is a partial side elevation of the scissor portion of the insect capturing device showing optional resilient means forward of the pivot point to provide tension and facilitate fast closure of the cup-shaped members and another optional resilient member rearward of the pivot point to urge the handle members apart to prevent the hand of the user from becoming fatigued.

As seen in FIG. 7, a plurality of notches 26 may be optionally provided on the rod members at longitudinally spaced locations forward of the pivot point with resilient means, such as a rubber band 27, looped thereover to provide tension and facilitate fast closure of the cup-shaped members.

Also as seen in FIG. 7 optional resilient means, such as a compression spring 28, may be installed rearward of the pivot point near the handle members for urging the handle members 13 and 14 apart to prevent the hand of the user from becoming fatigued.

Figure 8:
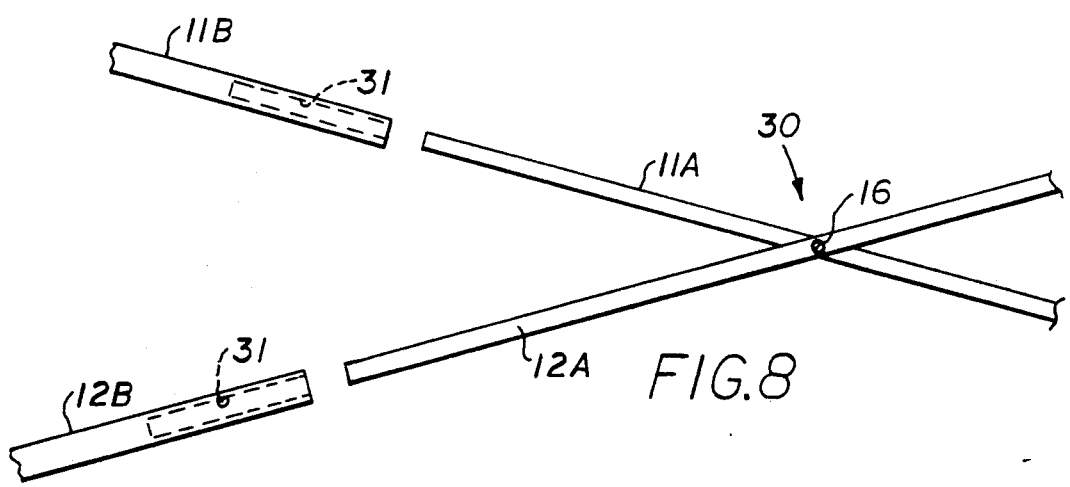
FIG. 8 shows a modification of the insect capturing device wherein the scissor mechanism and the rod members are removably connected for compact packaging.

FIG. 8 shown another modification wherein the scissor mechanism and the rod members are removably connected for compact packaging. In this modification, the scissor mechanism comprises a pair of short rod members 11A and 12A pivotally connected in the manner previously described. The rearward end of the rod members 11A and 12A serve as handles and may be bent into opposed loops to form handles 13 and 14, as previously shown and described, for receiving the thumb and fingers respectively of the user. The elongate rod members 11B and 12B each have an interior bore which is slidably received and frictionally engaged on the front ends of the rods 11A and 12A of the scissor mechanism 30.

Figure 9:
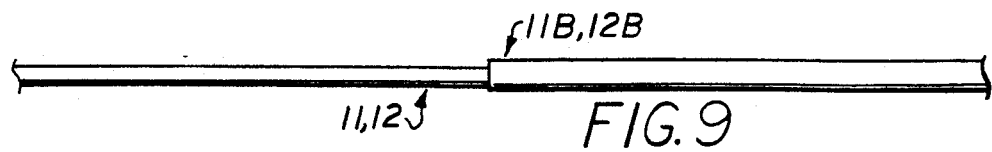
FIG. 9 shows a modification of the rod members of the insect capturing device wherein the rod members are telescoping for storage and compact packaging.

As illustrated in FIG. 9, the elongate rod members 11 and 12 or 11B and 12B may formed of telescoping tubular members such that they may be shortened for compactness and to change the distance of the cup-shaped members relative to the pivot point.

OPERATION

To use the insect capturing device, the user inserts his or her thumb and fingers into the looped handles 13 and 14 and holds the device like a pair of scissors with the cup-shaped members 20 and 21 opened a distance apart.

The cup-shaped members 20 and 21 in the open position are placed on opposite sides of the insect to be captured and then the handles are quickly squeezed together, bringing the flange members 18 and 19 together and trapping the insect inside the chamber formed by the opposed cup-shaped members. The magnetic attraction of the flange members 18 and 19 or the rubber band 27 (FIG. 7) facilitates their fast closure The magnetic flange properties, the mating fabric fastener elements 22 and 23 (FIG. 5), or the male and female configurations 24 and 25 (FIG. 6) will maintain the flanges in secure engagement. The lightweight rods and foraminous material of the cup-shaped members also facilitates fast closure The device will efficiently capture insects whether they are stationary, crawling, or flying.

The foraminous cup-shaped members of screen, mesh, or other holed lightweight material allows the insect to be seen and to facilitate extermination if desired The holes speed the closing of the cup members by decreasing air resistance and makes possible a lightweight device which uses a minimum of material. Most insects, and particularly houseflies will permit a person to gradually approach them close enough to surround them with the two opened cup-shaped members. If the cup members are large enough, and are closed quickly enough, the insect has nowhere to go but inside the closed cups.

The captured insect may then be seen and studied and may thereafter be released in a suitable location, or may be exterminated. The foraminous material of the cup-shaped members allows the trapped insect to be transported to a suitable location then sprayed with insecticide or dipped in water.

A plurality of holes may be provided through the rod members at longitudinally spaced locations to allow them to be connected together at various distances to change the pivot point relative to the cup-shaped members and thus the spacing apart of the cup-shaped members when they are in the open position. The rod members are quickly dismantled by removing the nut and bolt for packaging, storage, or transportation With the present device, the chore of eliminating insects may be turned into a game or sport of skill. The user will quickly develop the best technique in approaching and capturing both moving and non-moving insects and flying insects Alternate size cups may also be supplied to facilitate the development of insect catching skills under varied circumstances.

While this invention has been described fully and completely with special emphasis upon a preferred embodiment, it should be understood that within the scope of the appended claims the invention may be practiced otherwise than as specifically described herein.

I claim:

1. An insect capturing device for capturing an insect without killing it and to facilitate extermination if desired comprising:

a pair of elongate longitudinal members pivotally connected together at a point along their length to pivot relative to one another in a scissors fashion about the point of connection, hand gripping means at one end of each said longitudinal member for receiving the hand of the user to pivot said longitudinal members relative to one another, a pair of foraminous cup-shaped members secured in opposed relation one on each longitudinal member at the end opposite said hand gripping means and each having one open end in axial alignment, and releasable engagement means associated with said longitudinal members and said cup shaped members, whereby said cup-shaped members are moved by said longitudinal members between an open position spaced a distance apart and a closed position with said cup-shaped members brought face to face to form an enclosure for capturing an insect therein and said releasable engagement means facilitating a secure engagement of said cup-shaped members in the closed position to prevent accidental opening of the cup-shaped members and allowing the user to release said hand gripping means and still maintain said cup-shaped members in the closed position.

2. An insect capturing device according to claim 1 in which said releasable engagement means surrounds the open end of each said cup-shaped member to facilitate a secure engagement of said cup-shaped members.

3. An insect capturing device according to claim 2 in which said releasable engagement means comprises a magnetic material.

4. An insect capturing device according to claim 2 in which said releasable engagement means comprises mating elements of a fabric fastener material.

5. An insect capturing device according to claim 1 including attraction means surrounding the open end of each said cup-shaped member causing said cup-shaped members to be attracted toward one another when in close proximity and to snap together to assume the closed position and to facilitate a secure engagement of said cup-shaped members in the closed position.

6. An insect capturing device according to claim 5 in which
   attraction means comprises a magnetic material.

7. An insect capturing device according to claim 1 in which
   said elongate longitudinal members are adapted to be pivotally connected together at selective longitudinally spaced locations along their length to selectively position the pivot point relative to said cup-shaped members and thus the spacing apart of the cup-shaped members when they are in the open position.

8. An insect capturing device according to claim 7 in which
   each said elongate longitudinal member is provided with a plurality of longitudinally spaced holes along its length, and
   a releasable fastener received through a pair of axially aligned holes of each said longitudinal member for pivotally connecting said longitudinal members together at selective longitudinal spaced locations along their length.

9. An insect capturing device according to claim 1 in which
   said elongate longitudinal members are small diameter rod members of substantially equal size.

10. An insect capturing device according to claim 9 in which
    the rearward end of said rod members are bent into opposed loops to form handles one of which receives the thumb the other of which receives the fingers of the user.

11. An insect capturing device according to claim 9 in which
    each said rod member comprises telescopically joined sections such that they may be extended and retracted.

12. An insect capturing device according to claim 9 in which
    said rod members are bent into opposed loops to form handles one of which receives the thumb and the other of which receives the fingers of the user.

13. An insect capturing device according to claim 1 including
    resilient means engaged between said elongate members forward of their point of pivotal connection to provide tension therebetween in their open position and to facilitate fast closure of said cup-shaped members.

14. An insect capturing device according to claim 1 including
    resilient means engaged between said elongate members rearward of their point of pivotal connection to urge said hand gripping means apart to prevent the hand of the user from becoming fatigued.

15. An insect capturing device according to claim 1 in which
    each said elongate longitudinal member comprise a rod member having an elongate front section and a relatively short rear section removable connected together,
    each said foraminous cup-shaped member being secured at the forward end of each said elongate front section,
    each said rear section being pivotally connected together at a point along their length to pivot relative to one another in a scissors fashion about the point of connection, and
    each said elongate front section being removably connected each said rear section such that said front sections can be removed from said rear sections for compact storage.

* * * * *